(12) United States Patent
Huang (10) Patent No.: US 11,232,281 B1
(45) Date of Patent: Jan. 25, 2022

(54) METHOD OF FILTERING FINGERPRINT IMAGE

(71) Applicant: HIMAX TECHNOLOGIES LIMITED, Tainan (TW)

(72) Inventor: Tsung-Yau Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/936,406

(22) Filed: Jul. 22, 2020

(51) Int. Cl.
*G06K 9/00* (2006.01)
*G06K 9/40* (2006.01)
*G06K 9/54* (2006.01)
*G06T 5/00* (2006.01)
*G06T 5/30* (2006.01)
*G06T 7/194* (2017.01)
*G06K 9/46* (2006.01)
*G06T 3/40* (2006.01)

(52) U.S. Cl.
CPC .......... *G06K 9/00067* (2013.01); *G06K 9/40* (2013.01); *G06K 9/4604* (2013.01); *G06K 9/54* (2013.01); *G06T 3/4023* (2013.01); *G06T 5/002* (2013.01); *G06T 5/009* (2013.01); *G06T 5/30* (2013.01); *G06T 7/194* (2017.01); *G06T 2207/20032* (2013.01)

(58) Field of Classification Search
CPC . G06K 9/00006–0012; G06K 9/00067; G06K 9/40; G06K 9/54; G06K 9/4604; G06T 7/194; G06T 5/009; G06T 5/30; G06T 5/002; G06T 3/4023; G06T 2207/20032
See application file for complete search history.

(56) References Cited

U.S. PATENT DOCUMENTS

2005/0232472 A1* 10/2005 Scholze ............. G06K 9/00067
382/124
2021/0004559 A1* 1/2021 Ding ........................ G06K 9/60

FOREIGN PATENT DOCUMENTS

JP        2003044856 A  *  2/2003  ......... G06K 9/00087

* cited by examiner

*Primary Examiner* — Casey L Kretzer
(74) *Attorney, Agent, or Firm* — CKC & Partners Co., LLC (57) ABSTRACT

A method of filtering a fingerprint image is provided. The method includes: receiving an input fingerprint image; preliminarily filtering the input fingerprint image to obtain a preprocessed image; normalizing and then filtering the preprocessed image to obtain a denoised image; filtering and then segmenting the preprocessed image to obtain a background mask; postprocessing the background mask to obtain a final mask; and applying the final mask to the denoised image to obtain an output fingerprint image.

9 Claims, 7 Drawing Sheets

METHOD OF FILTERING FINGERPRINT IMAGE

BACKGROUND

Field of Invention

The present invention relates to fingerprint image processing. More particularly, the present invention relates to a method of filtering a fingerprint image.

Description of Related Art

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

An ideal sensed or scanned fingerprint image is characterized by smoothly flowing patterns of distinct ridges and valleys. Often, the imaging limitations, acquisition condition, age, maintenance of the original impression, as well as skin characteristics cause the acquired image to be far from ideal fingerprints. It is, therefore, desirable to enhance the sensed image, so that fingerprint features are properly extracted from the image.

SUMMARY

The present invention provides a method of filtering a fingerprint image. The method includes: receiving an input fingerprint image; preliminarily filtering the input fingerprint image to obtain a preprocessed image; normalizing and then filtering the preprocessed image to obtain a denoised image; filtering and then segmenting the preprocessed image to obtain a background mask; postprocessing the background mask to obtain a final mask; and applying the final mask to the denoised image to obtain an output fingerprint image.

In accordance with one or more embodiments of the invention, in which preliminarily filtering the input fingerprint image includes: median filtering the input fingerprint image; and performing an image denoising process by using a non-local means denoising algorithm to obtain a first image after median filtering the input fingerprint image.

In accordance with one or more embodiments of the invention, in which preliminarily filtering the input fingerprint image further includes: median filtering the first image to obtain a second image; normalizing the second image by local mean to obtain a third image; and median filtering the third image to obtain the preprocessed image.

In accordance with one or more embodiments of the invention, in which normalizing and then filtering the preprocessed image includes: using a local normalization algorithm to normalize the preprocessed image; and performing a brightness adjusting process to adjust image intensity values of the normalized preprocessed image.

In accordance with one or more embodiments of the invention, in which normalizing and then filtering the preprocessed image further includes: global normalizing and then median filtering the normalized preprocessed image before performing the brightness adjusting process.

In accordance with one or more embodiments of the invention, in which filtering and then segmenting the preprocessed image includes: performing a brightness adjusting process to adjust image intensity values of the preprocessed image; applying a local mean filter to the adjusted preprocessed image to obtain a local mean mask; applying a local variance filter to the adjusted preprocessed image to obtain a local variance mask; and multiplying the local mean mask and the local variance mask to obtain the background mask.

In accordance with one or more embodiments of the invention, in which filtering and then segmenting the preprocessed image includes: performing a brightness adjusting process to adjust image intensity values of the preprocessed image; applying a local mean filter to the adjusted preprocessed image to obtain a local mean mask of the adjusted preprocessed image; applying a local variance filter to the adjusted preprocessed image to obtain a local variance mask of the adjusted preprocessed image; applying a local mean filter to the denoised image to obtain a local mean mask of the denoised image; applying a local variance filter to the denoised image to obtain a local variance mask of the denoised image; and multiplying the local mean mask of the adjusted preprocessed image, the local variance mask of the adjusted preprocessed image, the local mean mask of the denoised image, and the local variance mask of the denoised image to obtain the background mask.

In accordance with one or more embodiments of the invention, in which postprocessing the background mask includes: dilating the background mask to produce a first destination image; finding contours of the first destination image; removing noise blocks of the first destination image, and a size of each of the noise blocks of the first destination image is less than a threshold; filling area bounded by the contours of the first destination image after removing the noise blocks of the first destination image so as to update the first destination image; eroding the updated first destination image to produce a second destination image; finding contours of the second destination image; removing noise blocks of the second destination image, and a size of each of the noise blocks of the second destination image is less than the threshold; filling area bounded by the contours of the second destination image after removing the noise blocks of the second destination image so as to update the second destination image; dilating the updated second destination image to produce a third destination image; and performing a fill boundary hole algorithm on each side of the third destination image to produce the final mask.

In accordance with one or more embodiments of the invention, in which postprocessing the background mask further includes: finding contours of the third destination image; removing noise blocks of the third destination image, and a size of each of the noise blocks of the third destination image is less than the threshold; and filling area bounded by the contours of the third destination image after removing the noise blocks of the third destination image so as to update the third destination image.

In accordance with one or more embodiments of the invention, the fill boundary hole algorithm is respectively performed on four sides of the third destination image, in which performing the fill boundary hole algorithm on one of four sides of the third destination image includes: dilating the third destination image by five pixels to produce a dilated image; adding a bar with a width of five pixels outside the one of four sides of the dilated image to produce an expand image; finding contours of the expand image; removing noise blocks of the expand image, and a size of each of the noise blocks of the expand image is less than the threshold;

filling area bounded by the contours of the expand image after removing the noise blocks of the expand image so as to update the expand image; and eroding the updated expand image by five pixels to update the third destination image.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
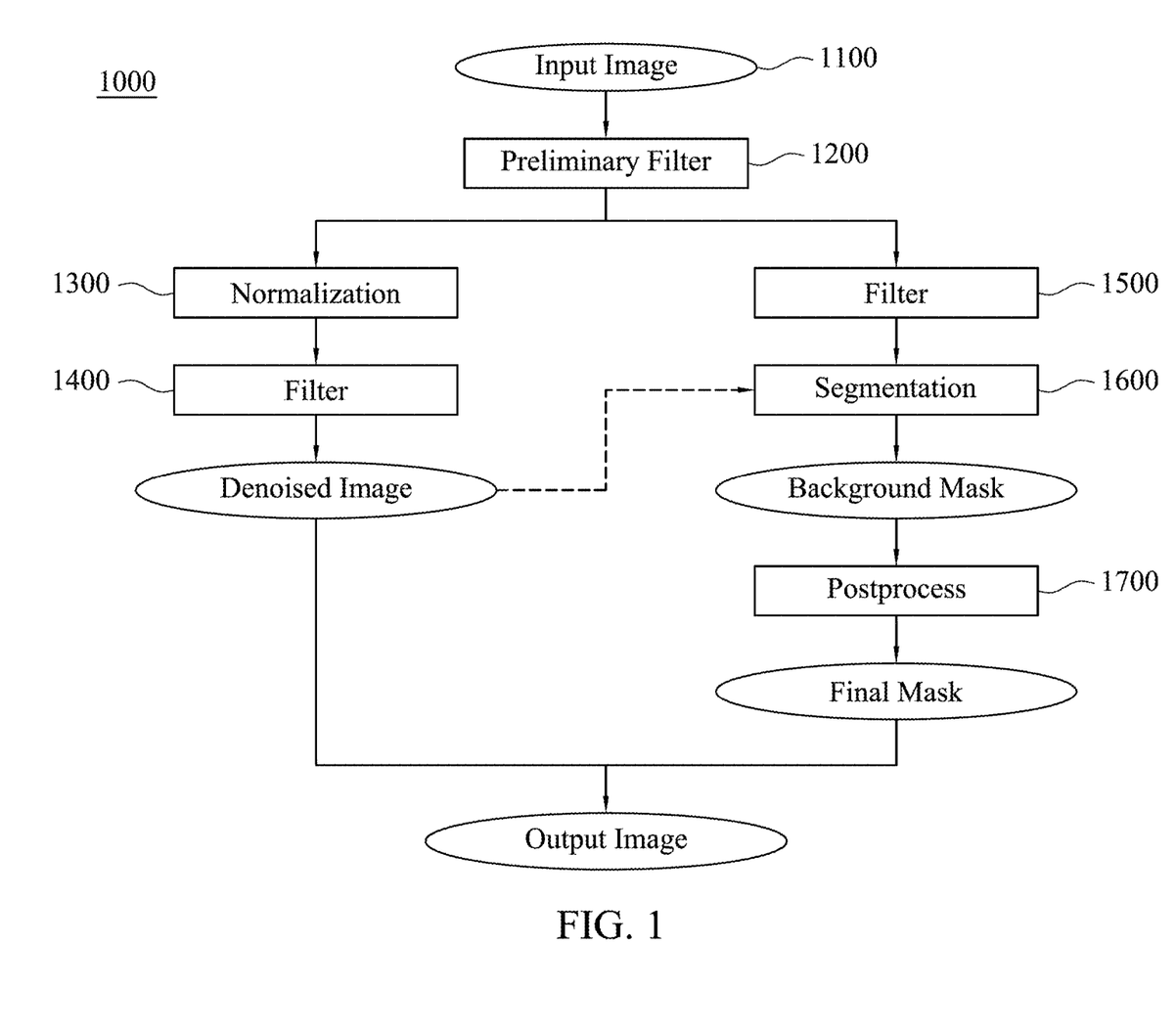
FIG. 1 illustrates a flow chart of a method for filtering a fingerprint image according to some embodiments of the present invention.

FIG. 1 illustrates a flow chart of a method 1000 for filtering a fingerprint image according to some embodiments of the present invention. The method 1000 includes steps 1100-1700. In step 1100, an input image is received, and the input image is a fingerprint image. In some embodiments of the present invention, the fingerprint image is grayscale image sensed by a capacitive-based fingerprint sensor of a door lock, but the present invention is not limited thereto. Each pixel of the grayscale image has a grayscale value.

Figure 2:
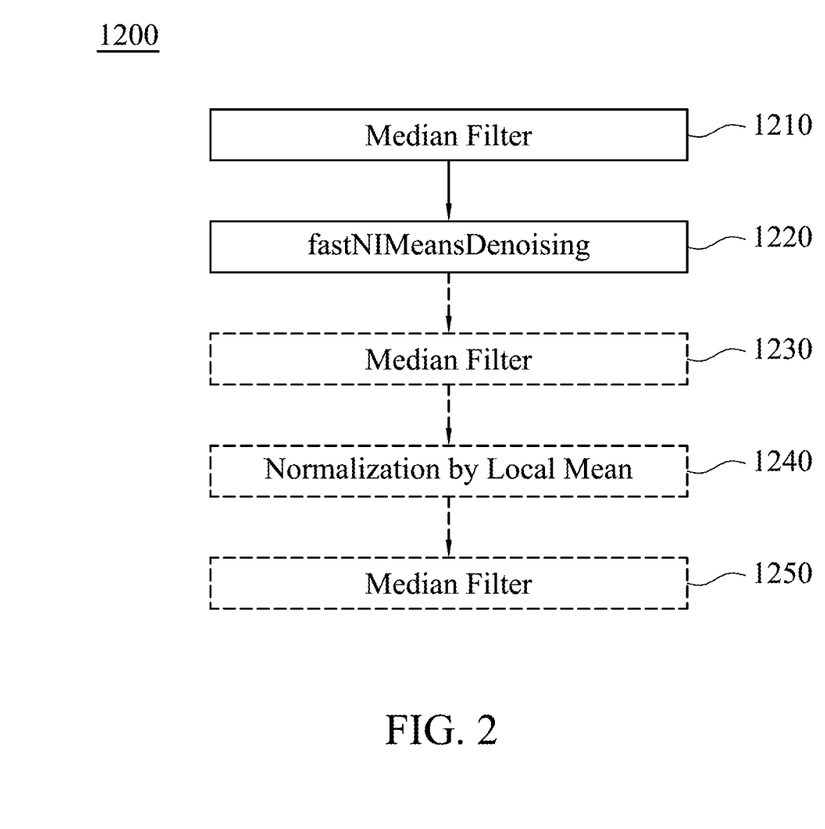
FIG. 2 a flow chart of preliminarily filtering process according to some embodiments of the present invention.

Then, in step 1200, a preliminarily filtering process is performed on the input image to reduce noise in the input image, thereby obtaining a preprocessed image. FIG. 2 illustrates a flow chart of the preliminarily filtering process in step 1200 according to some embodiments of the present invention. The preliminarily filtering process in step 1200 includes steps 1210 and 1220, and may optionally include steps 1230-1250.

In step 1210, a median filter is applied on the input image to reduce noise in the input image. That is, median filtering is performing on the input image in two dimensions, and each output pixel contains the median value of grayscale values of the 3*3 pixels in a neighborhood around the corresponding pixel in the input image. In some embodiments of the present invention, the said median filtering may be function titled "medfilt2" in Matlab.

Then, in step 1220, an image denoising process is performed by using a non-local means denoising algorithm to reduce gaussian white noise, thereby obtaining a first image. In some embodiments of the present invention, the said non-local means denoising algorithm may be function titled "fastNlMeansDenoising" in C++.

Then, in step 1230, the median filter used in step 1210 is applied on the first image to reduce noise in the first image, thereby obtaining a second image. Then, in step 1240, the second image is normalized by local mean to obtain a third image. Then, in step 1250, the median filter used in step 1210 is applied on the third image to reduce noise in the third image, thereby obtaining the preprocessed image.

Specifically, in step 1240, each grayscale value of pixels of the second image is normalized to a normalized value X within a range between 0 and 1. Then, a normalized local mean value X' of each pixel of the second image is calculated by the following equation: X'=X−mean(11*11 area around X)+0.5. That is, the mean value of the normalized values X of the 11*11 pixels in a neighborhood around the corresponding pixel is subtracted from the normalized values X of the corresponding pixel, and then the resulting value is added by 0.5. A cropping process is then performed to remove the undesired area including pixels with the normalized local mean values outside the range between 0 and 1, thereby obtaining the third image.

Figure 3:
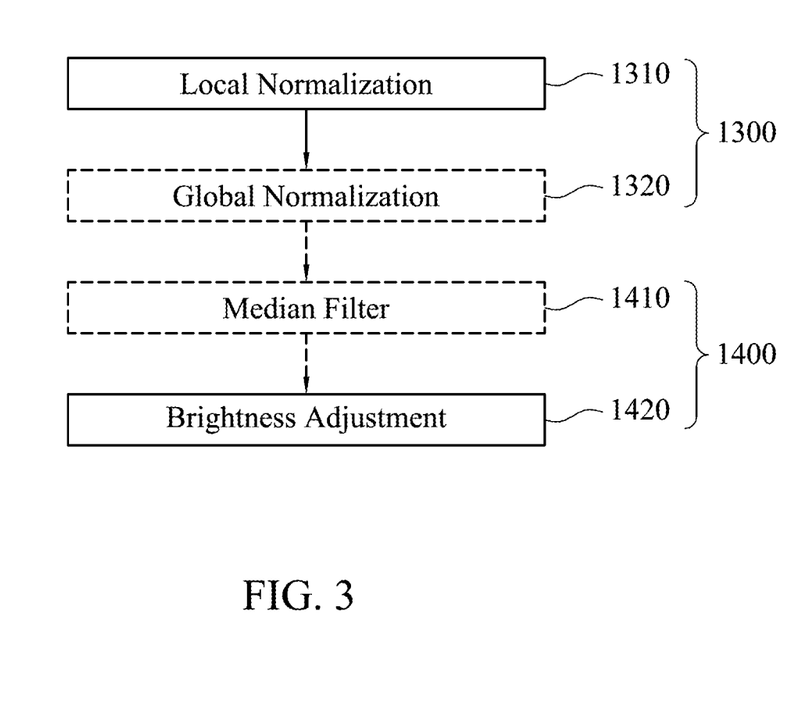
FIG. 3 illustrates a flow chart of normalization process and filtering process according to some embodiments of the present invention.

Referring now to FIG. 1, in step 1300, a normalization process is performed on the preprocessed image to normalize the preprocessed image. Then, in step 1400, a filtering process is performed on the normalized preprocessed image to filter the normalized preprocessed image, thereby obtaining a denoised image. FIG. 3 illustrates a flow chart of the normalization process in step 1300 and the filtering process in step 1400 according to some embodiments of the present invention. The normalization process in step 1300 includes step 1310, and may optionally include step 1320. The filtering process in step 1400 includes step 1420, and may optionally include step 1410.

In step 1310, a local normalization algorithm is used to reduce difference of illumination of the preprocessed image, thereby normalizing the preprocessed image. That is, the local normalization algorithm is used to uniformize the local mean and variance of the preprocessed image. In some embodiments of the present invention, the said local normalization algorithm may be function titled "localnormalize" in Matlab.

Then, in step 1320, the normalized preprocessed image is global normalized. Specifically, in step 1320, each grayscale value of pixels of the normalized preprocessed image is normalized to a normalized value X within a range between 0 and 1. Then, a normalized local mean value X' of each pixel of the normalized preprocessed image Img is calculated by the following equation: X'=X−mean(Img)+0.5. That is, the mean value of the normalized values X of all pixels of the normalized preprocessed image Img is subtracted from the normalized values X of the corresponding pixel, and then the resulting value is added by 0.5. A cropping process is then performed to remove the undesired area including pixels with the normalized local mean values outside the range between 0 and 1, thereby obtaining a resulting image.

Then, in step 1410, a median filter is applied on the resulting image of step 1300 to reduce noise in the resulting image of step 1300. That is, median filtering is performing on the resulting image of step 1300 in two dimensions, and each output pixel contains the median value of the 2×2 pixels in a neighborhood around the corresponding pixel in the resulting image of step 1300. In some embodiments of the present invention, the said median filtering may be function titled "medfilt2" in Matlab.

Then, in step 1420, a brightness adjusting process is performed on the resulting image of step 1410 to adjust image intensity values of the resulting image of step 1410, thereby obtaining the denoised image. That is, the brightness adjusting process is performed to increase contrast of the resulting image of step 1410. In some embodiments of the present invention, the said brightness adjusting process may be function titled "imadjust" in Matlab.

Figure 4:
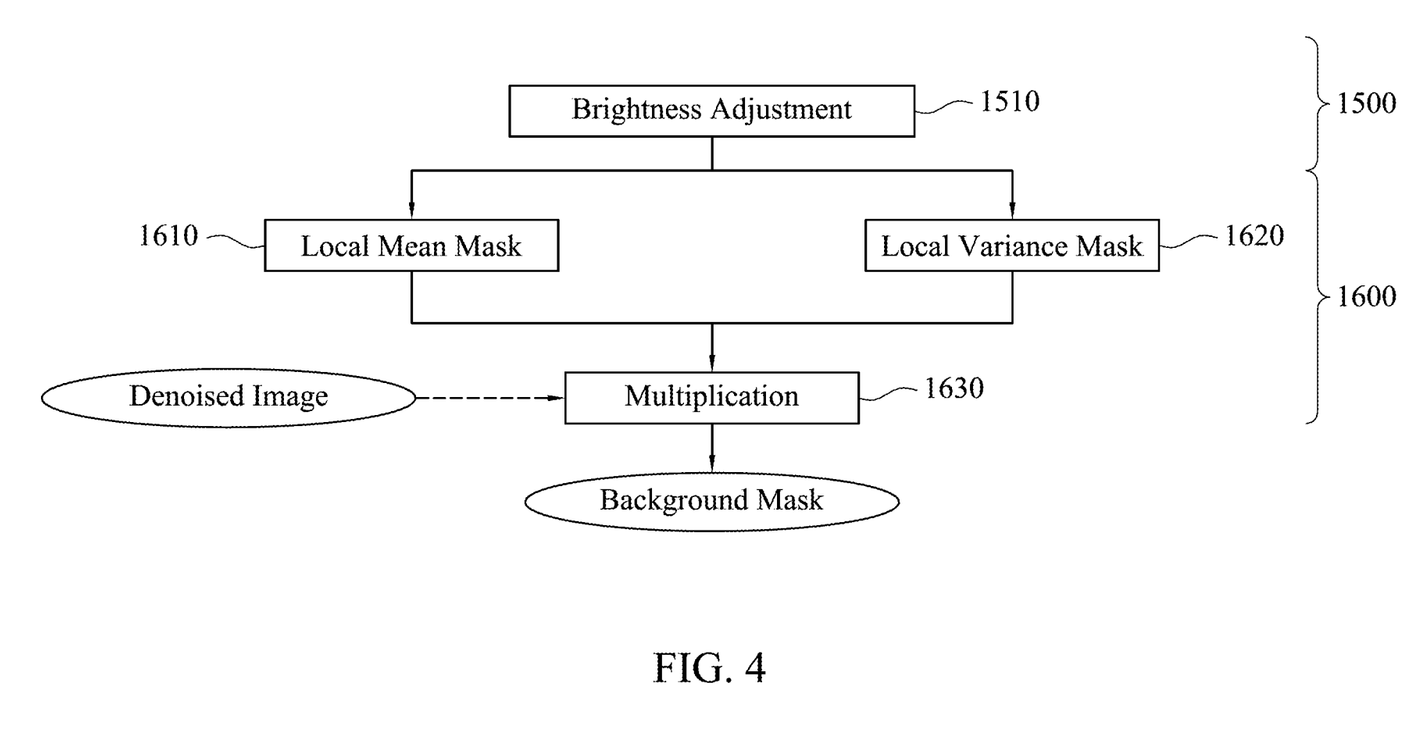
FIG. 4 illustrates a flow chart of filtering process and segmentation process according to some embodiments of the present invention.

Referring now to FIG. 1, in step 1500, a filtering process is performed on the preprocessed image to filter the preprocessed image. Then, in step 1600, a segmentation process is performed on the filtered preprocessed image, thereby obtaining a background mask. FIG. 4 illustrates a flow chart of the filtering process in step 1500 and the segmentation process in step 1600 according to some embodiments of the present invention. The filtering process in step 1500 includes step 1510. The segmentation process in step 1600 includes steps 1610, 1620, and 1630.

In step 1510, a brightness adjusting process is performed on the preprocessed image to adjust image intensity values of the preprocessed image, thereby obtaining the adjusted preprocessed image. That is, the brightness adjusting process is performed to increase contrast of the preprocessed image. In some embodiments of the present invention, the said brightness adjusting process may be function titled "imadjust" in Matlab.

In step 1610, a local mean filter is applied to the adjusted preprocessed image to obtain a local mean mask of the adjusted preprocessed image. Specifically, the local mean value of each pixel of the adjusted preprocessed image is calculated, in which the local mean value of the corresponding pixel is the mean value of the grayscale values of the 9*9 pixels in a neighborhood around the corresponding pixel. Then, the local mean value of each pixel is compared with a mean threshold. When the local mean value of the corresponding pixel is larger than the mean threshold, the corresponding pixel is determined to correspond to a background pixel. When the local mean value of the corresponding pixel is not larger than the mean threshold, the corresponding pixel is determined to correspond to a non-background pixel. Further, the background pixel is assumed to be a white pixel. When the background pixel is defined as a black pixel, the local mean value of the corresponding pixel is inverted. Accordingly, the local mean mask of the adjusted preprocessed image composed of the background pixels and the non-background pixels is obtained.

In step 1620, a local variance filter is applied to the adjusted preprocessed image to obtain a local variance mask of the adjusted preprocessed image. Specifically, the local variance value of each pixel of the adjusted preprocessed image is calculated, in which the local variance value of the corresponding pixel is the variance value of the grayscale values of the 9*9 pixels in a neighborhood around the corresponding pixel. Then, the local variance value of each pixel is compared with a variance threshold. When the local variance value of the corresponding pixel is less than the variance threshold, the corresponding pixel is determined to correspond to a background pixel. When the local variance value of the corresponding pixel is not less than the variance threshold, the corresponding pixel is determined to correspond to a non-background pixel. Accordingly, the local variance mask of the adjusted preprocessed image composed of the background pixels and the non-background pixels is obtained.

In some embodiments of the present invention, in step 1630, multiplying the local mean mask of the adjusted preprocessed image and the local variance mask of the adjusted preprocessed image to obtain the background mask, in which the said multiplying process may be function titled element-wise multiplication. In some other embodiments of the present invention, in step 1630, applying a local mean filter to the denoised image to obtain a local mean mask of the denoised image, and applying a local variance filter to the denoised image to obtain a local variance mask of the denoised image, and multiplying the local mean mask of the adjusted preprocessed image, the local variance mask of the adjusted preprocessed image, the local mean mask of the denoised image, and the local variance mask of the denoised image to obtain the background mask. Please note that the background mask is a binary image.

Figure 5:
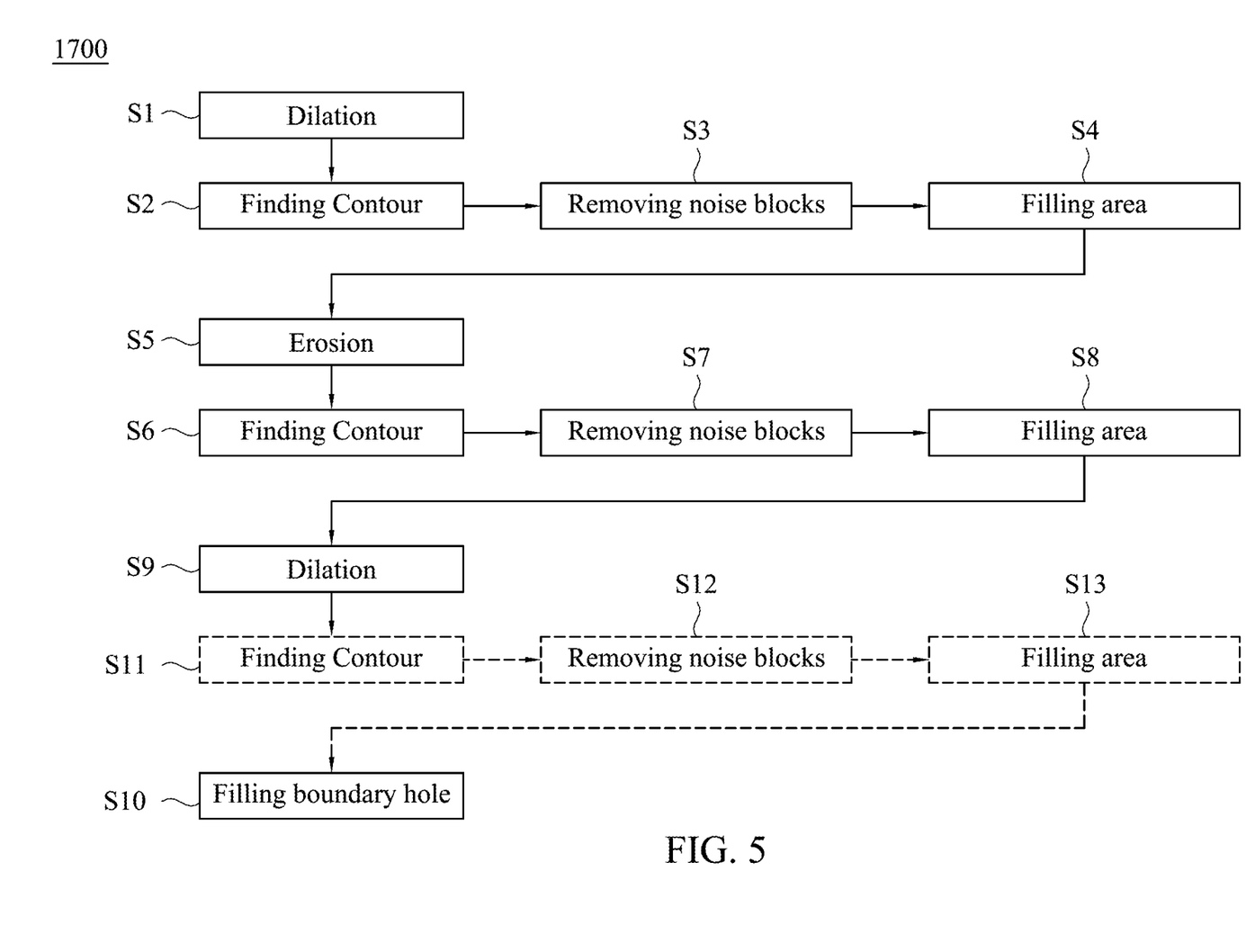
FIG. 5 illustrates a flow chart of the postprocessing process according to some embodiments of the present invention.

Referring now to FIG. 1, in step 1700, a postprocessing process is performed on the background mask to obtain a final mask. Finally, the final mask is applied to the denoised image to obtain an output image, in which the output image is a refined fingerprint image. In some embodiments of the present invention, multiplying the final mask and the denoised image to obtain the output image, in which the said multiplying process may be function titled element-wise multiplication. FIG. 5 illustrates a flow chart of the postprocessing process in step 1700 according to some embodiments of the present invention. The postprocessing process in step 1700 includes steps S1-S10, and may optionally include steps S11-S13.

In step S1, a dilation process is performed on the background mask to obtain a first destination image. That is, the background mask is dilated for joining broken parts of the background mask. In some embodiments of the present invention, the said dilation process may be function titled "cv2.dilate" in Intel Corporation's OpenCV (Open Source Computer Vision) libraries.

Then, in step S2, a finding contours algorithm is used to retrieve contours from the first destination image. That is, the contours of the first destination image are detected. In some embodiments of the present invention, the said finding contours algorithm may be function titled "cv2.findContours" in Intel Corporation's OpenCV libraries.

Then, in step S3, noise blocks of the first destination image are removed, in which a size of each of the noise blocks is less than a threshold.

Then, in step S4, a filling area algorithm is used to fill the area bounded by the contours of the first destination image by several polygonal contours after removing the noise blocks, so as to update the first destination image. In some embodiments of the present invention, the said filling area algorithm may be function titled "cv2.fillPoly" in Intel Corporation's OpenCV libraries.

Then, in step S5, an erosion process is performed on the updated first destination image to obtain a second destination image. That is, the updated first destination image is eroded for removing small white noises in the updated first destination image. In some embodiments of the present invention, the said erosion process may be function titled "cv2.erode" in Intel Corporation's OpenCV (Open Source Computer Vision) libraries.

Then, in step S6, the finding contours algorithm described in step S2 is used to retrieve contours from the second destination image. Then, in step S7, noise blocks of the second destination image are removed, in which a size of each of the noise blocks is less than a threshold. Then, in step S8, the filling area algorithm described in step S4 is used to fill the area bounded by the contours of the second destination image after removing the noise blocks, so as to update the second destination image. Then, in step S9, the dilation process described in step S1 is performed on the updated second destination image to obtain a third destination image.

Then, in step S11, the finding contours algorithm described in step S2 is used to retrieve contours from the third destination image. Then, in step S12, noise blocks of the third destination image are removed, in which a size of each of the noise blocks is less than a threshold. Then, in step S13, the filling area algorithm described in step S4 is used to fill the area bounded by the contours of the third destination image after removing the noise blocks, so as to update the third destination image.

Figure 6:
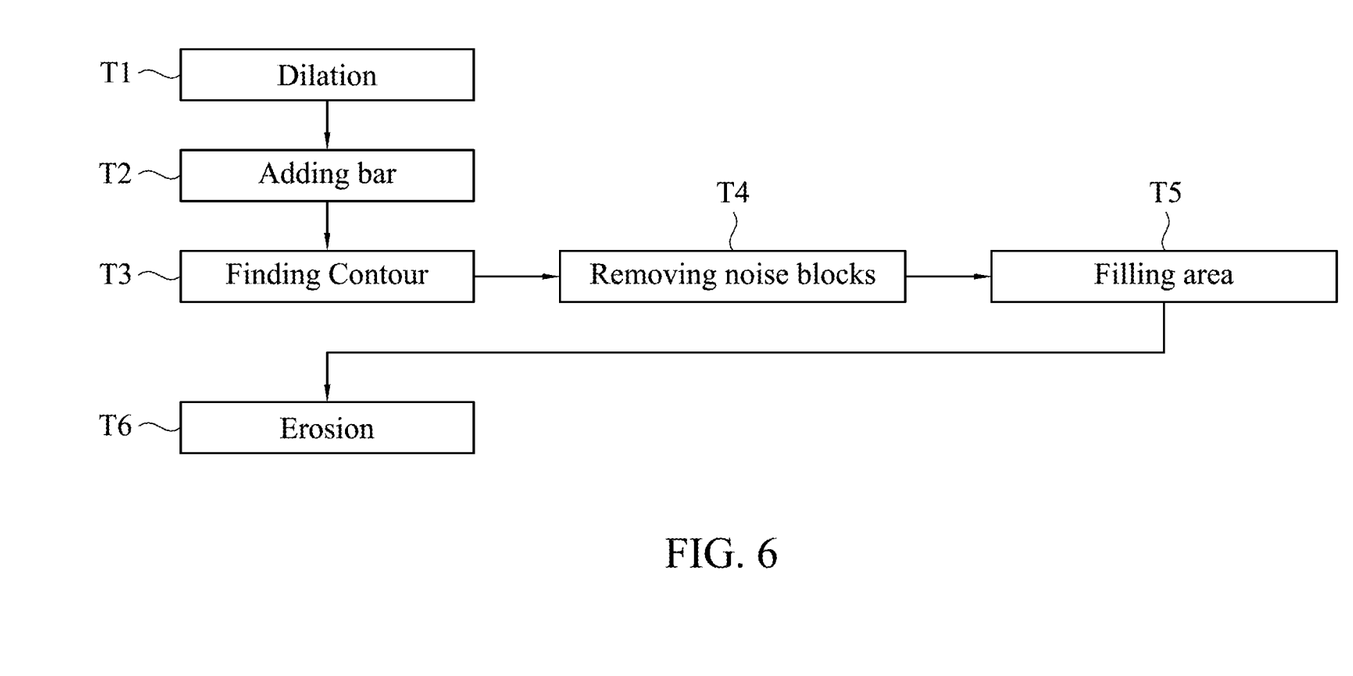
FIG. 6 illustrates a flow chart of the filling boundary hole algorithm performed on one of four sides of an updated third destination image according to some embodiments of the present invention.

Then, in step S10, a filling boundary hole algorithm is performed on each of four sides of the updated third destination image to obtain the final mask. FIG. 6 illustrates a flow chart of the filling boundary hole algorithm performed on one of four sides of the updated third destination image according to some embodiments of the present invention. The filling boundary hole algorithm performed on one of four sides of the updated third destination image includes steps T1-T6.

In step T1, a dilation process is performed on the updated third destination image to obtain a dilated image. In some embodiments of the present invention, the updated third destination image is dilated by five pixels. In some embodiments of the present invention, the said dilation process may be function titled "cv2.dilate" in Intel Corporation's OpenCV libraries.

Then, in step T2, a bar with a width of five pixels is added outside the one of four sides of the dilated image to produce an expand image. In some embodiments of the present invention, the said added bar is next to the dilated image.

Then, in step T3, the finding contours algorithm described in step S2 is used to retrieve contours from the expand image. Then, in step T4, noise blocks of the expand image are removed, in which a size of each of the noise blocks is less than a threshold. Then, in step T5, the filling area algorithm described in step S4 is used to fill the area bounded by the contours of the expand image after removing the noise blocks, so as to update the expand image.

Then, in step T6, an erosion process is performed on the updated expand image. In some embodiments of the present invention, the updated expand image is eroded by five pixels. In some embodiments of the present invention, the said erosion process may be function titled "cv2.erode" in Intel Corporation's OpenCV (Open Source Computer Vision) libraries. Please note that the steps T1-T6 are repeated four times for four sides of the updated third destination image.

Figure 7A:
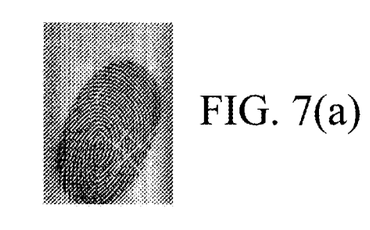
FIGS. 7(a)-7(i) illustrate several resulting images of different steps according to some embodiments of the present invention.
Figure 7B:
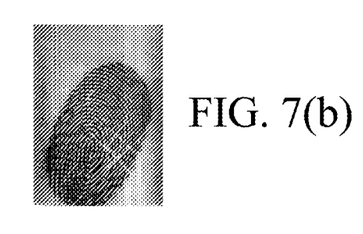
Figure 7C:
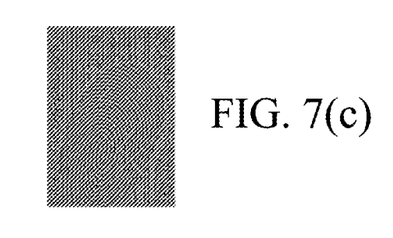
Figure 7D:
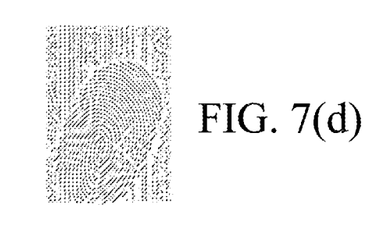
Figure 7E:
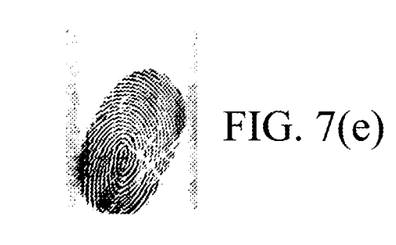
Figure 7F:
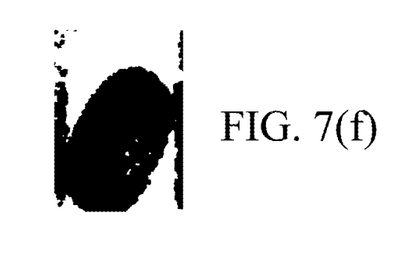
Figure 7G:
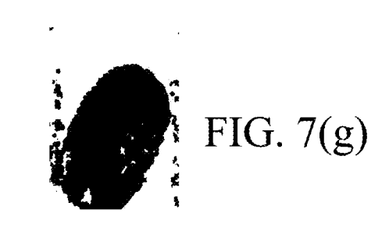
Figure 7H:
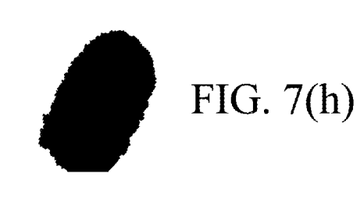
Figure 7I:
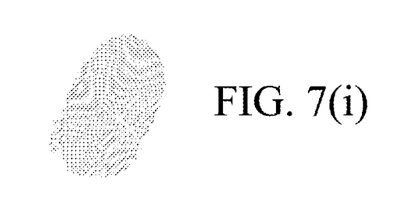

FIGS. 7(a)-7(i) illustrate several resulting images of different steps according to some embodiments of the present invention. FIG. 7(a) shows the input image in the step 1100. FIG. 7(b) shows the first image in the step 1220. FIG. 7(c) shows the normalized preprocessed image in the step 1310. FIG. 7(d) shows the denoised image in the step 1420. FIG. 7(e) shows the adjusted preprocessed image in the step 1510. FIG. 7(f) shows the local mean mask in the step 1610. FIG. 7(g) shows the local variance mask in step 1620. FIG. 7(h) shows the final mask after the step 1700. FIG. 7(i) shows the output image.

From the above description, the present invention provides a method of filtering a fingerprint image. In comparison with the input fingerprint image in FIG. 7(a) and the output fingerprint image in FIG. 7(i), the input fingerprint image is denoised and the background of the input fingerprint image is segment, thereby enhancing the input fingerprint image to obtain the output fingerprint image, so that fingerprint features are properly extracted from the output fingerprint image.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of filtering a fingerprint image, comprising:
receiving an input fingerprint image;
preliminarily filtering the input fingerprint image to obtain a preprocessed image;
normalizing and then filtering the preprocessed image to obtain a denoised image;
filtering and then segmenting the preprocessed image to obtain a background mask;
postprocessing the background mask to obtain a final mask; and
applying the final mask to the denoised image to obtain an output fingerprint image;
wherein preliminarily filtering the input fingerprint image comprises:
median filtering the input fingerprint image; and
performing an image denoising process by using a non-local means denoising algorithm to obtain a first image after median filtering the input fingerprint image.

2. The method of claim 1, wherein preliminarily filtering the input fingerprint image further comprises:
median filtering the first image to obtain a second image;
normalizing the second image by local mean to obtain a third image; and
median filtering the third image to obtain the preprocessed image.

3. The method of claim 1, wherein normalizing and then filtering the preprocessed image comprises:
using a local normalization algorithm to normalize the preprocessed image; and
performing a brightness adjusting process to adjust image intensity values of the normalized preprocessed image.

4. The method of claim 3, wherein normalizing and then filtering the preprocessed image further comprises:
global normalizing and then median filtering the normalized preprocessed image before performing the brightness adjusting process.

5. The method of claim 1, wherein filtering and then segmenting the preprocessed image comprises:
performing a brightness adjusting process to adjust image intensity values of the preprocessed image;

applying a local mean filter to the adjusted preprocessed image to obtain a local mean mask;

applying a local variance filter to the adjusted preprocessed image to obtain a local variance mask; and multiplying the local mean mask and the local variance mask to obtain the background mask.

6. The method of claim 1, wherein filtering and then segmenting the preprocessed image comprises:

performing a brightness adjusting process to adjust image intensity values of the preprocessed image;

applying a local mean filter to the adjusted preprocessed image to obtain a local mean mask of the adjusted preprocessed image;

applying a local variance filter to the adjusted preprocessed image to obtain a local variance mask of the adjusted preprocessed image;

applying a local mean filter to the denoised image to obtain a local mean mask of the denoised image;

applying a local variance filter to the denoised image to obtain a local variance mask of the denoised image; and multiplying the local mean mask of the adjusted preprocessed image, the local variance mask of the adjusted preprocessed image, the local mean mask of the denoised image, and the local variance mask of the denoised image to obtain the background mask.

7. The method of claim 1, wherein postprocessing the background mask comprises:

dilating the background mask to produce a first destination image;

finding contours of the first destination image;

removing noise blocks of the first destination image, wherein a size of each of the noise blocks of the first destination image is less than a threshold;

filling area bounded by the contours of the first destination image after removing the noise blocks of the first destination image so as to update the first destination image;

eroding the updated first destination image to produce a second destination image;

finding contours of the second destination image;

removing noise blocks of the second destination image, wherein a size of each of the noise blocks of the second destination image is less than the threshold;

filling area bounded by the contours of the second destination image after removing the noise blocks of the second destination image so as to update the second destination image;

dilating the updated second destination image to produce a third destination image; and performing a fill boundary hole algorithm on each side of the third destination image to produce the final mask.

8. The method of claim 7, wherein postprocessing the background mask further comprises:

finding contours of the third destination image;

removing noise blocks of the third destination image, wherein a size of each of the noise blocks of the third destination image is less than the threshold; and filling area bounded by the contours of the third destination image after removing the noise blocks of the third destination image so as to update the third destination image.

9. The method of claim 7, wherein the fill boundary hole algorithm is respectively performed on four sides of the third destination image, wherein performing the fill boundary hole algorithm on one of four sides of the third destination image comprises:

dilating the third destination image by five pixels to produce a dilated image;

adding a bar with a width of five pixels outside the one of four sides of the dilated image to produce an expand image;

finding contours of the expand image;

removing noise blocks of the expand image, wherein a size of each of the noise blocks of the expand image is less than the threshold;

filling area bounded by the contours of the expand image after removing the noise blocks of the expand image so as to update the expand image; and eroding the updated expand image by five pixels to update the third destination image.

* * * * *